(12) United States Patent
Droge

(10) Patent No.: US 7,076,651 B2
(45) Date of Patent: Jul. 11, 2006

(54) SYSTEM AND METHOD FOR HIGHLY SECURE DATA COMMUNICATIONS

(75) Inventor: John C. Droge, Hermosa Beach, CA (US)

(73) Assignee: Safenet, Inc., Belcamp, MD (US)

( * ) Notice: Subject to any disclaimer, the term of this patent is extended or adjusted under 35 U.S.C. 154(b) by 709 days.

(21) Appl. No.: 09/841,168

(22) Filed: Apr. 24, 2001

(65) Prior Publication Data

US 2002/0004898 A1 Jan. 10, 2002

Related U.S. Application Data

(60) Provisional application No. 60/201,579, filed on May 1, 2000.

(51) Int. Cl.
*H04L 9/00* (2006.01)

(52) U.S. Cl. .................. 713/151; 380/210; 380/255; 380/42; 380/43; 726/3; 709/230; 709/238; 713/153; 713/160

(58) Field of Classification Search ............... 713/160, 713/162, 151–153, 161, 201; 380/210
See application file for complete search history.

(56) References Cited

U.S. PATENT DOCUMENTS

| 5,721,778 A * | 2/1998 | Kubota et al. ............... 380/212 |
| 6,542,992 B1 * | 4/2003 | Peirce et al. ................ 713/153 |
| 6,697,872 B1 * | 2/2004 | Moberg et al. ............ 709/238 |
| 2002/0101989 A1 * | 8/2002 | Markandey et al. ........ 380/210 |

FOREIGN PATENT DOCUMENTS

EP 406187 A1 * 1/1991

\* cited by examiner

*Primary Examiner*—Gilberto Barron, Jr.
*Assistant Examiner*—Samson Lemma
(74) *Attorney, Agent, or Firm*—Venable, LLP; James R. Burdett

(57) ABSTRACT

A system and method for highly secure data communication. Embodiments of the invention may include encrypting data a first time, packetizing the data, encrypting the data a second time and transmitting the data. Encryption may occur at a data link layer and an Internet Protocol layer. Packetized, twice encrypted data may be transmitted over a network, such as, for example, the Internet. The system may include a first computer system containing data for transmission, a first interface device that receives data from the first computer system, a second interface device that receives data from the first interface device, and a second computer system that receives data from the second interface device.

43 Claims, 11 Drawing Sheets

SYSTEM AND METHOD FOR HIGHLY SECURE DATA COMMUNICATIONS

RELATED APPLICATION

The present invention relates to U.S. Provisional Patent Application No. 60/201,579, filed May 1, 2000, which is incorporated herein by reference in its entirety and from which priority is claimed.

BACKGROUND

1. Field of the Invention

The present invention relates to the field of data communications. Particular embodiments of the invention relate to systems and methods for transmitting highly secure data over public and private communication networks.

2. Related Art

The continually increasing reliance by the commercial, industrial, military and government markets on data transmission over public and private communication networks has resulted in a continually increasing requirement that such transmission be secure. Because data that is transmitted over a network can easily be intercepted, personal, confidential and classified information can easily be compromised and used improperly and illegally absent a secure means of transmitting such information.

Commercial activity over networks such as the Internet frequently involve the transmission of confidential data such as credit card numbers, social security numbers and the like. Unfortunately, transmitted confidential data can be and is frequently compromised by the interception of such data by unscrupulous network users, typically resulting in serious financial and emotional detriment to the victim.

Likewise, data transmission activities in the industrial sector also require transmissions that are secure. Industrial espionage in the United States results in losses totaling billions of dollars each year for American businesses. Industrial enterprise operates at a distinct disadvantage due to the illegal interception of proprietary data transmitted over public and private communication networks, ultimately resulting in decreased corporate profits and corporate viability.

The requirement for secure transmission of data in military and government intelligence operations cannot be over-emphasized. Indeed, considering the ever-present threat of aggression by foreign military establishments against United States allies and the United States itself, along with the constant and crippling threat of terrorism nationally and abroad, the security of the United States and other countries is threatened and well at risk by the transmission of sensitive or classified information in an unsecure manner.

The requirement for secure data transmission over communication networks has prompted the development of various systems and methods that attempt to satisfy such requirements. One such attempt is to implement a private data communication link or network as shown in FIG. 1. A private data communication link or network may be implemented to securely transmit data by utilizing a dedicated line of communication 6. The dedicated line of communication may be interconnected between a first computer 2 and a second computer 4, each implementing a standard network protocol 2A, 4A to facilitate data transmission over the dedicated line of communication 6. This approach has the advantage that only those persons or organizations that have access to the dedicated communication line 6 may access data being transmitted across it. Consequently, this approach to data communications is very easy to manage. However, a dedicated line is expensive compared to public networks such as the Internet, and such expense may become cost prohibitive even for organizations with abundant resources.

Other attempts for providing secure transmission of data over communication networks implement data encryption prior to transmission over a public network. Protocols such as the Secure Sockets Layer (SSL) and Secure HTTP (S-HTTP), an extension to the ubiquitous HTTP, have become widely used for transmitting information over the Internet. Use of the Internet for the transmission of confidential or sensitive information has given rise to the Virtual Private Network (VPN), a network constructed using the Internet to connect various nodes through which encrypted data is transmitted using IP Security (IPSec), a set of protocols supporting the secure exchange of packets at the IP layer. Although such protocols currently provide high levels of security (some supporting 128-bit encryption and higher), the rapid advances in processing technology will soon make such protocols easy to compromise. Furthermore, the aforementioned protocols do not prevent a hacker from determining that data is being transmitted and, possibly, observing how much data is being transmitted, which information may be valuable in itself. Accordingly, such protocols can provide only limited security.

Clearly, the commercial, industrial, military and government markets currently face a shortage of increasingly secure, cost-effective systems and methods of data transmission. Thus, the need for such systems and methods remains critical.

SUMMARY

A method for securely transmitting and receiving data according to an embodiment of the present invention may comprise obtaining data on a first computer system for transmission. The data may be encrypted a first time such that the data is once encrypted. Subsequently, the first computer system may transmit the once encrypted data to a first interface device. The first interface device may receive the once encrypted data, packetize it, and encrypt the packetized, once encrypted data a second time such that the data is then twice encrypted. The first interface device may then transmit the packetized, twice encrypted data to a second interface device.

The second interface device may receive the packetized, twice encrypted data and decrypt it and reconstruct, or depacketize, the data such that the data is then once decrypted and reconstructed. The second interface device may then transmit the reconstructed, once decrypted data to a second computer system. The second computer system may receive the reconstructed, once decrypted data and decrypt the reconstructed, once decrypted data a second time such that it is then available for use.

Data encrypted a first time may be encrypted at a data link layer. Such data link layer encrypted data may be transmitted and received using a modem. Data encrypted a second time may be encrypted at an Internet Protocol layer. Packetized, twice encrypted data may be transmitted and received over a network using a network interface card. The network may be the Internet.

Data decrypted a first time may be decrypted at an Internet Protocol layer. Data decrypted a second time may be decrypted at a data link layer.

A system for securely transmitting and receiving data may include a first computer system for encrypting and transmitting data. The first computer system may have a transmission mechanism such as a modem. The system may also include a first interface device for receiving once encrypted data from the first computer system, and for packetizing, encrypting and transmitting data. The first interface device may have a receiving mechanism, such as a modem, and a network connection utilizing a network interface card.

The system may also include a second interface device for receiving twice encrypted data from the first interface device, and for decrypting, reconstructing and transmitting data. The second interface device may a network connection utilizing a network interface card and a transmission mechanism such as a modem.

The system may also include a second interface device for receiving twice encrypted data from the first interface device, and for decrypting, reconstructing and transmitting data. The second interface device may have a network connection utilizing a network interface card and a transmission mechanism such as a modem.

The first computer system may once encrypt data and transmit the once encrypted data to the first interface device via the transmission mechanism of the first computer system. The first interface device may receive the once encrypted data via the receiving mechanism of the first interface device, packetize the once encrypted data, encrypt the once encrypted data and transmits twice encrypted data to the second interface device via a network. The network may be the Internet.

The second interface device may receive the twice encrypted data from the first interface device via the network, once decrypt the twice encrypted data, reconstruct the packetized data and transmit reconstructed, once decrypted data to the second computer system via the transmission mechanism of the second interface device. The second computer system may receive once decrypted data from the second interface device via the receiving mechanism of the second computer system and decrypt the once decrypted data a second time.

A method for securely transmitting data according to an embodiment of the present invention may also packetize data, encrypt data at an Internet Protocol layer, encrypt data again at a data link layer, and transmit the data over a communication link.

BRIEF DESCRIPTION OF THE DRAWINGS

These and other features, aspects, and advantages of the present invention will become better understood when viewed in light of the accompanying drawings where.

DETAILED DESCRIPTION

Figure 1:
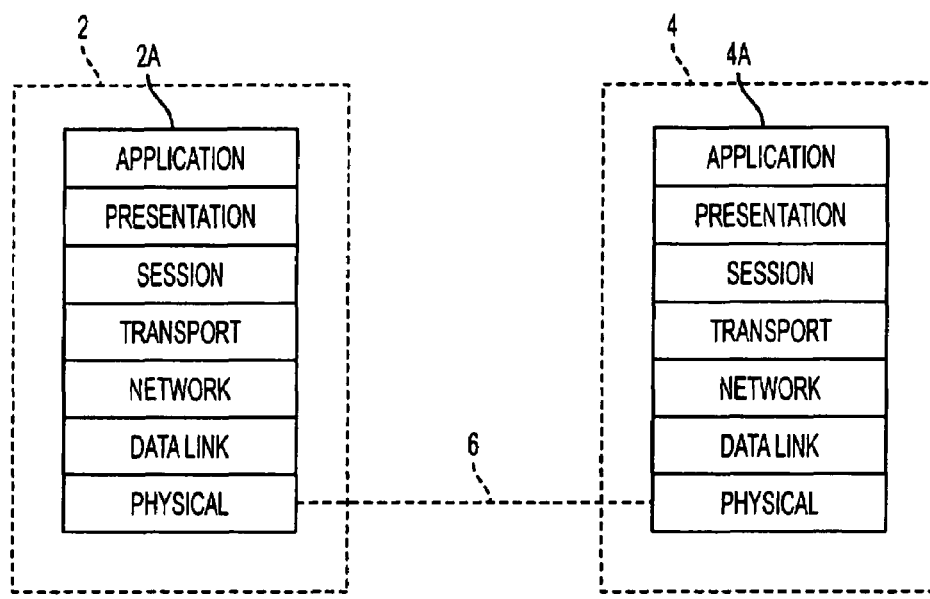
FIG. 1 is a block diagram of a prior art system for transmitting data.
Figure 2:
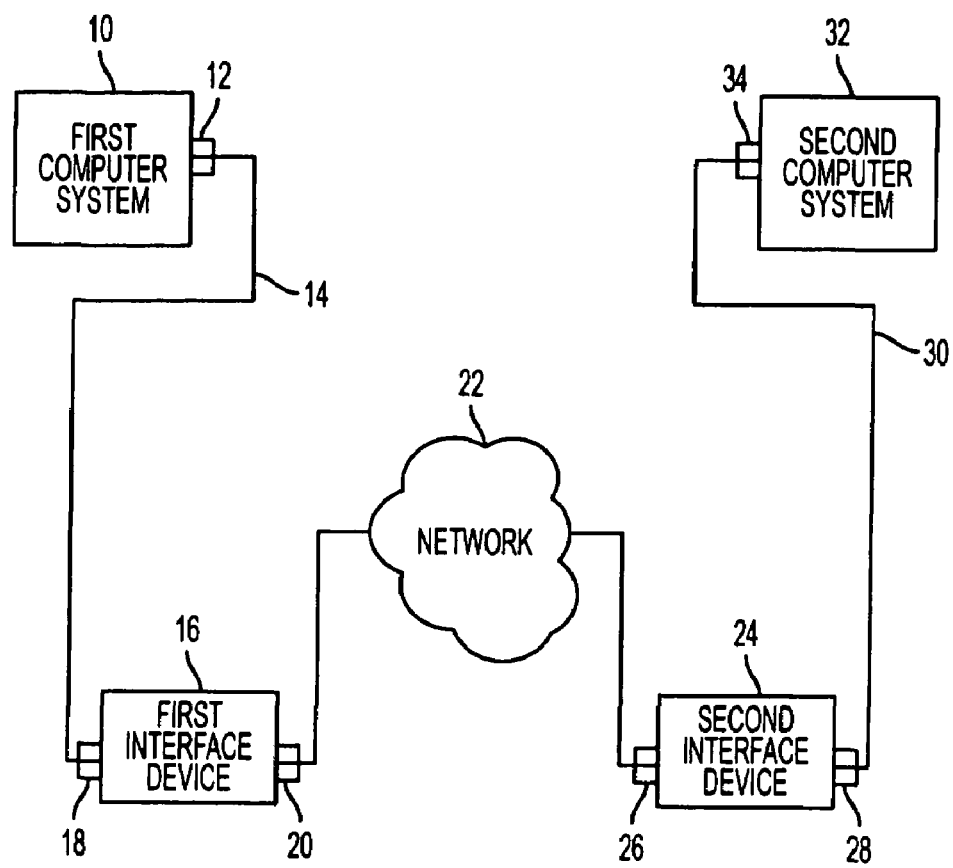
FIG. 2 is a block diagram of a system for securely transmitting data according to an embodiment of the present invention.

A block diagram of a system according to an embodiment of the present invention is shown in FIG. 2. Generally, a first computer system 10 containing data for transmission comprises a first modem 12 or other mechanism for the transmission of data to a first interface device 16 over a transmission medium 14. The first computer system 10 may also include a mechanism for encrypting data. The first modem 12 may also be used by the first computer system 10 to receive data.

The first interface device 16 connects to the transmission medium 14 via a second modem 18 or other mechanism such that it may receive data from the first computer system 10. The first interface device 16 may also interface to a packet switched network 22, such as, for example, the Internet, utilizing, for example, a network interface card (NIC) 20, which may have an Ethernet connection. The packet switched network 22 may be implemented in a variety of ways, and may be a wired or wireless network. The interface 20 to the packet switched network 22 may be used to transmit data to a second interface device 24. The first interface device 16 may include a mechanism for packetizing and encrypting data. The first interface device 16 may also receive information from the second interface device 24 and transmit data to the first computer system 10.

The second interface device 24 may also interface to the packet switched network 22 utilizing, for example, a NIC 26 and an Ethernet connection such that it may receive data transmitted from the first interface device 16 . The second interface device 24 may also comprise a third modem 28 or other transmission mechanism for the transmission of data to a second computer system 32 over a transmission medium 30. The second interface device 24 may also include a mechanism for decrypting data and reconstructing, or depacketizing, data. The third modem 28 may also be used by the second interface device 24 to receive data from the second computer system 32. Additionally, the second interface device 24 may transmit data to the first interface device 16 via its interface 26 to the packet switched network 22.

The second computer system 32 comprises a fourth modem 34 or other mechanism for receiving data from the second interface device 24 over a transmission medium 30. The second computer system 32 may also include a mechanism for decrypting data. The fourth modem 34 may also be used by the second computer system 32 to transmit data.

Examining FIG. 2 in more detail, the first computer system 10 may be a single computer containing a processor, memory, input and output, and other functions common to computer systems. Alternatively, the first computer system 10 may be a network of computers arranged in a variety of fashions. For example, the first computer system 10 may be arranged in a client-server fashion, wherein a server computer functions as a system controller for one or more client computers. The server computer and the client computers may be connected via a local area network (LAN).

The first modem 12 or other mechanism used to transmit data from the first computer system 10 to the first interface device 16 may also serve as a data encryption device as well as a modulator. Thus, the data may be encrypted at the first computer system 10 using the first modem 12. Alternatively, the data encryption device may be independent of the first modem 12. The transmission medium 14 over which the first computer system 10 transmits data may be a public switched telephone network (PSTN) or other type of dedicated communication link, such as an Integrated Services Data Network (ISDN) line, a Digital Subscriber Line (DSL), a T-1 line, a dedicated wireless connection or the like.

The first interface device 16 may also be a single computer containing a processor, memory, input and output, and other functions common to computer systems. Alternatively, the first interface device 16 may also be a network of computers arranged in a variety of fashions or may simply be a dedicated processing system functioning solely to packetize and encrypt a second time data received from the first computer system 10 and transmit the packetized, twice encrypted data to the second interface device 24 via the packet switched network 22.

The second interface device 24 may be similar to the first interface device 16 and may be a single computer containing a processor, memory, input and output, and other functions common to computer systems or may be a network of computers arranged in a variety of fashions. Alternatively, the second interface device 24 may simply be a dedicated processing system functioning solely to decrypt and reconstruct packetized, encrypted data received from the first interface device 16 and transmit such data to the second computer system 32 via a modem 28 or other transmission mechanism. The transmission medium 30 over which the second interface device 24 sends data to the second computer system 32 may also be a PSTN. Alternatively, the transmission medium 30 may be another type of dedicated communication link, such as ISDN, DSL, T-1, a dedicated wireless connection or the like.

The second computer system 32 may be similar to the first computer system 10 and may be a single computer containing a processor, memory, input and output, and other functions common to computer systems. Alternatively, the second computer system 32 may be a network of computers arranged in a variety of fashions. For example, the second computer system 32 may be arranged in a client-server fashion, wherein a server computer functions as a system controller for one or more client computers. The server computer and the client computers may be connected via a LAN.

The fourth modem 34 or other mechanism used by the second computer system 32 to receive transmitted data from the second interface device 24 may also serve as a data decryption device as well as a demodulator. Thus, the data may be decrypted at the second computer system 32 using the fourth modem 34. Alternatively, the data decryption device may be independent of the fourth modem 34. The transmission medium 30 over which the second computer system 32 receives data may be a PSTN or other type of dedicated communication link, such as ISDN, DSL, T-1 or the like.

Figure 3:
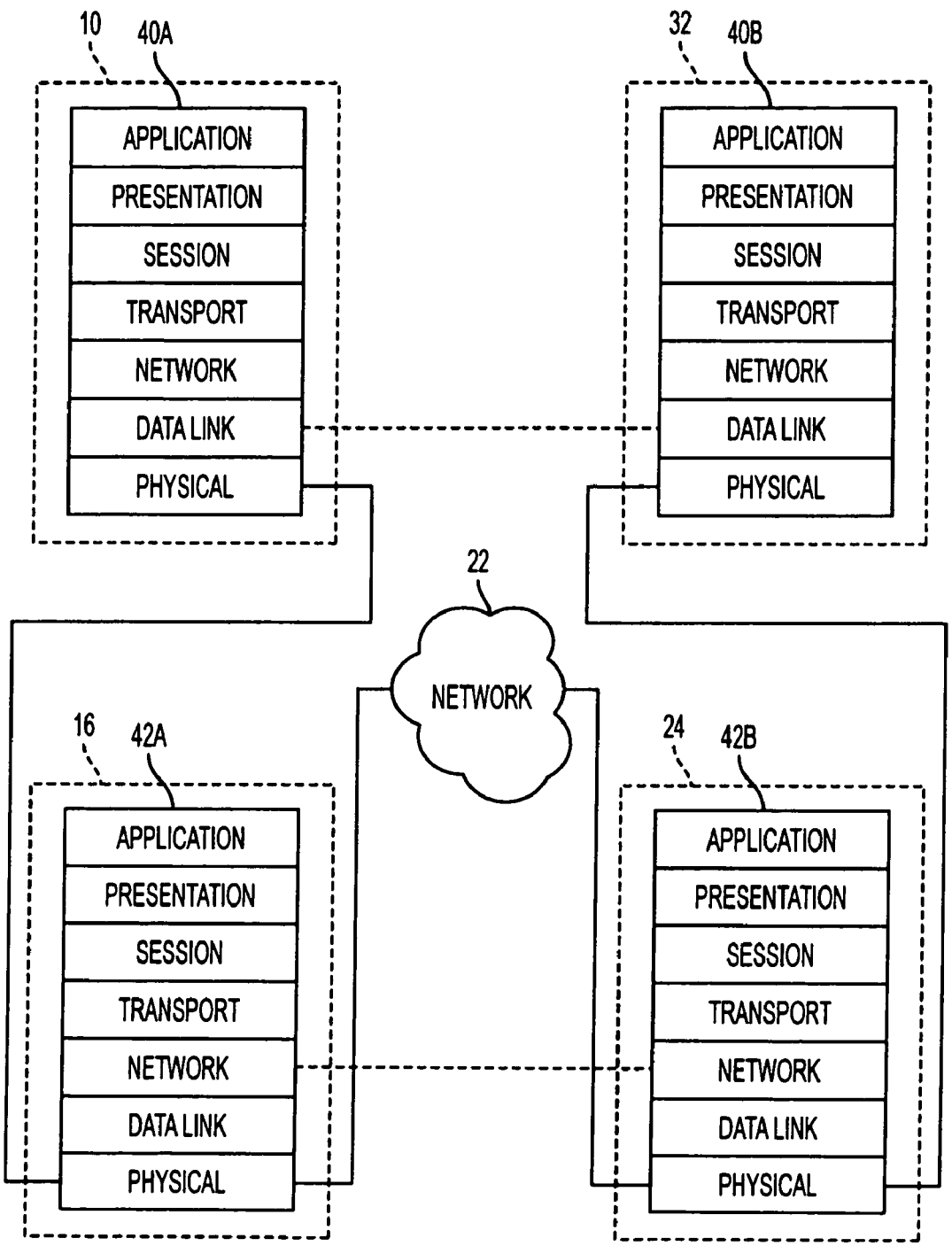
FIG. 3 is a block diagram of a network model for securely transmitting data according to an embodiment of the present invention.
Figure 4A:
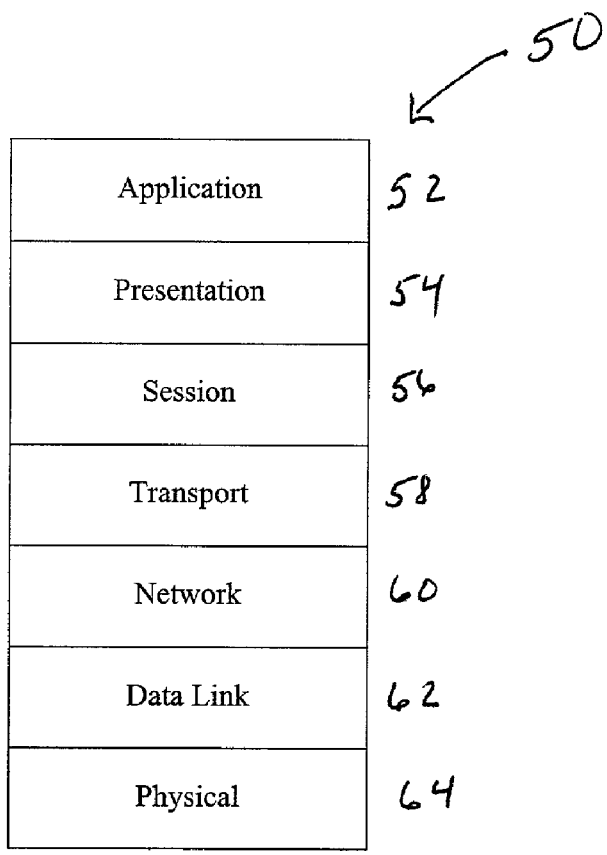
FIG. 4A is a block diagram of an Open System Interconnection reference model.

A block diagram according to an embodiment of the present invention using a network model may be seen in FIG. 3. For purposes of elucidation, the Open Systems Interconnection (OSI) reference model 50 is shown in FIG. 4A. The OSI reference model 50 is well-known in the art and will be described here only briefly. The OSI reference model 50 is a conceptual model and describes how data in one computer is transferred through a network to another computer, i.e., it provides a framework for communication between computers over a network. The OSI reference model 50 comprises seven layers, each layer specifying a function of the network. As shown in FIG. 4A, the OSI reference model 50 comprises an application layer (layer 7) 52, a presentation layer (layer 6) 54, a session layer (layer 5) 56, a transport layer (layer 4) 58, a network layer (layer 3) 60, a data link layer (layer 2) 62, and a physical layer (layer 1) 64.

Data that is transferred from a software application in one computer (i.e., at the application layer 52) to another computer must pass through each layer of the OSI reference model 50. For example, if a document created in a word processing application on one computer were to be transferred to another computer, the word processing application would transfer the data corresponding to the document to the presentation layer 54, which would in turn transfer the data to the session layer 56, and so on, until the data is transferred to the physical layer 64, i.e., the actual physical medium, such as cables and wires, used to transfer data. The receiving computer would receive the data at the physical layer 64 and transfer the data up through the OSI reference model 50 layers until the data exists as a document in the word processing application on the receiving computer.

The data link layer 62 provides network and protocol characteristics for the transmission of data across a physical network link. Specifications for the data link layer 62 may define physical addressing, network topology, error notification, flow control and other network and protocol characteristics. The data link layer 62 may also manage access to the physical medium through the physical layer. The network layer 60 provides functions such as routing that enable multiple links to be combined into a network.

The application layer 52, presentation layer 54 and session layer 56 are sometimes referred to as the upper layers and are usually implemented only in software. The transport layer 58, network layer 60, data link layer 62 and physical layer 64 are sometimes referred to as the lower layers and are typically implemented in hardware and software.

Figure 4B:
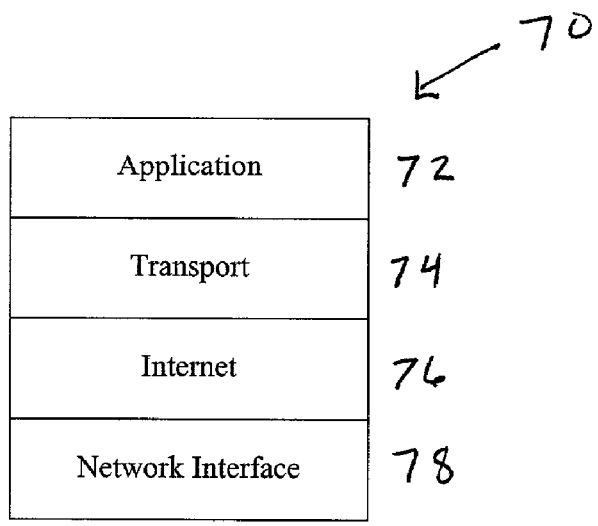
FIG. 4B is a block diagram of a network model according to a TCP/IP protocol stack.

A suite of communication protocols widely in use today for transmitting information over networks such as the Internet is commonly referred to as Transmission Control Protocol/Internet Protocol (TCP/IP). A simplified TCP/IP protocol stack 70 is shown in FIG. 4B. TCP/IP is well-known in the art and will not be described here. The simplified TCP/IP protocol stack 70 shown in FIG. 4B has four layers—an application layer 72, a transport layer 74, an Internet layer 76 and a network interface layer 78. Various aspects of a TCP/IP protocol stack 70 may roughly be mapped to the OSI reference model 50. In particular, the Internet layer 76, or the Internet Protocol (IP) layer of the TCP/IP protocol stack 70, may provide functions that are roughly similar to the OSI reference model 50 network layer 60. Accordingly, the terms "network layer" and "IP layer" may be used interchangeably throughout this application.

Referring back to FIG. 3, data may be encrypted at a data link layer 40A of a first computer 10 and transmitted via a modem or other transmission mechanism to a first interface device 16. At the first interface device 16, the data is packetized according to standard TCP/IP protocols and further encrypted at the network or IP layer 42A. Encryption at the data link layer 40A may be effected using any data link layer encryption mechanism, including, without limitation, devices implementing data link layer encryption techniques currently available on the market such as the Mykotronx PALLADIUM or KIV-7 or the Cylink LINK ENCRYPTOR. Encryption at the network or IP layer 42A may be effected using any IP layer encryption technique, such as, for example, an Internet Protocol (IP) packet encryption method such as IPSec. Algorithms that may be used to encrypt data at both the data link and IP layers include, without limitation, the DATA ENCRYPTION STANDARD (DES), TRIPLE DES, the ADVANCED ENCRYPTION STANDARD (AES), SKIPJACK and BLOWFISH.

Once data has been packetized and encrypted at the IP layer, it may be sent out over a packet switching network 22, such as, for example, the Internet, where it is retrieved by a second interface device 24 that decrypts the data at the IP layer 42B using an IP layer decrypting algorithm that is the reverse of the encrypting algorithm used by the first interface device 16 to encrypt the data. The data, which at this stage of the transmission is no longer IP layer encrypted but only data link layer encrypted, is then reconstructed, or depacketized, and then transmitted to a second computer 32 where it is decrypted at the data link layer 40B using a data link layer decrypting algorithm that is the reverse of the encrypting algorithm used by the first computer 10 to encrypt the data. At this stage, the data is no longer encrypted and is available for use by a user.

Figure 5:
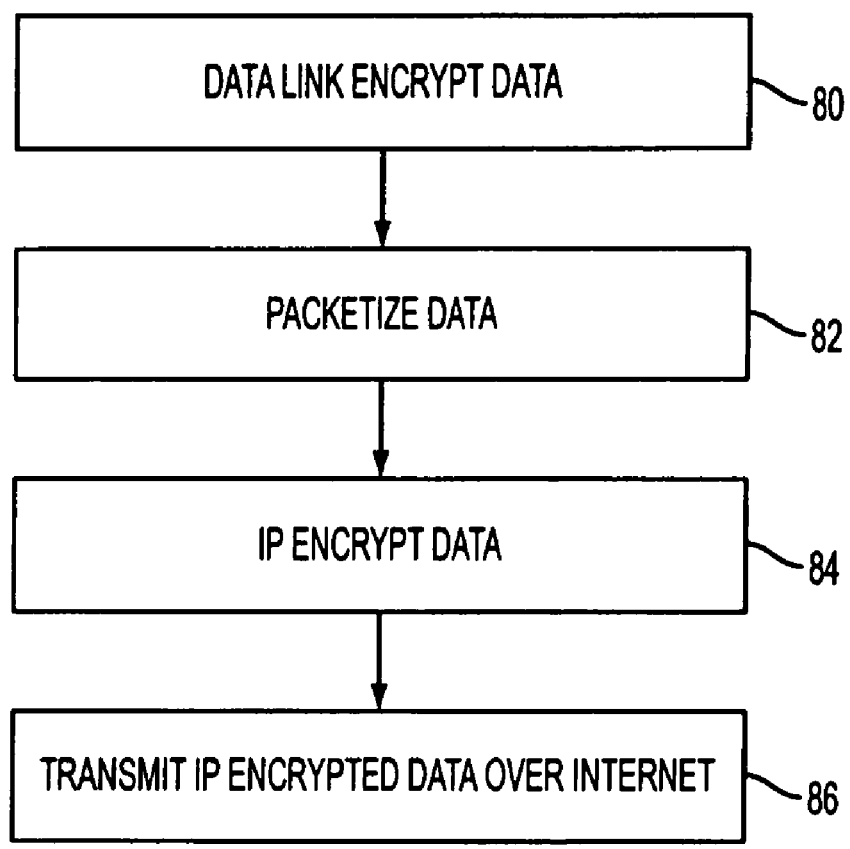
FIG. 5 is a flow chart of a general method for securely transmitting data according to an embodiment of the present invention.

A flow chart showing a general method for securely transmitting data according to embodiments of the present invention is shown in FIG. 5. Data that requires secure transmission may be encrypted at the data link layer at step 80. Subsequently, the data link-encrypted data may be packetized at step 82 such that it is suitable for transmission over a packet switching network, such as, for example, the Internet. Next, the packetized data may be IP layer encrypted at step 84, and then transmitted over the Internet or other packet switched network at step 86.

Figure 6:
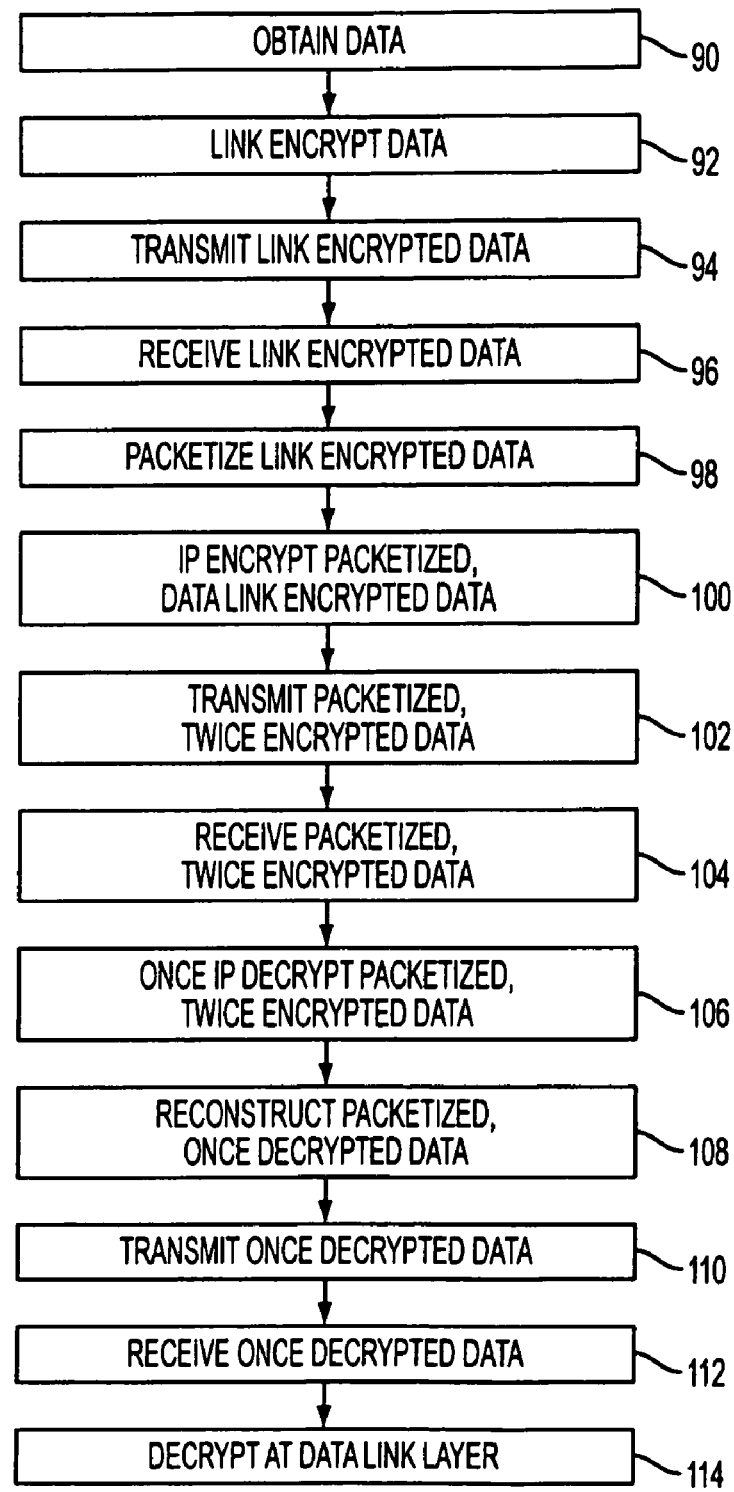
FIG. 6 is a flow chart of a method for securely transmitting and receiving data according to an embodiment of the present invention.

A flow chart showing a more detailed method for securely transmitting and receiving data according to embodiments of the present invention is shown in FIG. 6. At step 90, data to be securely transmitted is obtained. The data may be obtained by a first computer or computer system. Once obtained, the data is encrypted at a data link layer at step 92. The data may be encrypted using any encryption algorithm according to the needs of a user. For example, algorithms that are typically used for encryption at a data link layer include, but are not limited to, DES, TRIPLE DES, AES, SKIPJACK and BLOWFISH.

Once the data has been encrypted at a data link layer, the data may be transmitted to a first interface device over a transmission medium at step 94. The data link encrypted data may be transmitted using a modem over a dedicated line, such as, for example, lines used in a conventional telephone system. The data link encrypted data may then be received by the first interface device using a modem at step 96.

Once the data link encrypted data has been received by the first interface device, it may be wrapped, i.e., it may be packetized at step 98 and encrypted again at an IP layer at step 100. Subsequently, wrapped data, or, in other words, the packetized, twice encrypted data, may be transmitted to a second interface device over a packet switching network, such as the Internet at step 102. In this way, embodiments of the present invention may implement VPNs to transmit data.

Once transmitted, the packetized, twice encrypted data may be received by the second interface device connected to the packet switched network at step 104 and the process may be reversed, or unwrapped. At step 106, the packetized, twice encrypted data is IP decrypted. The packets are then reconstructed at step 108, then transmitted over a dedicated line at step 110. The second interface device may transmit the reconstructed, once decrypted data using a modem. It is understood that the data at this point may also be referred to again as once encrypted data, since decrypting a first time data that has been encrypted twice results in data that is again encrypted only once. However, for consistency, twice encrypted data that has been decrypted once will be referred to as once decrypted data.

Subsequently, the reconstructed, once decrypted data is received by a second computer or computer system at step 112. The second computer or computer system may also use a modem for receiving the reconstructed, once decrypted data. The second computer or computer system then decrypts the reconstructed, once decrypted data at step 114, making it available in an unencrypted form for a user.

Figure 7:
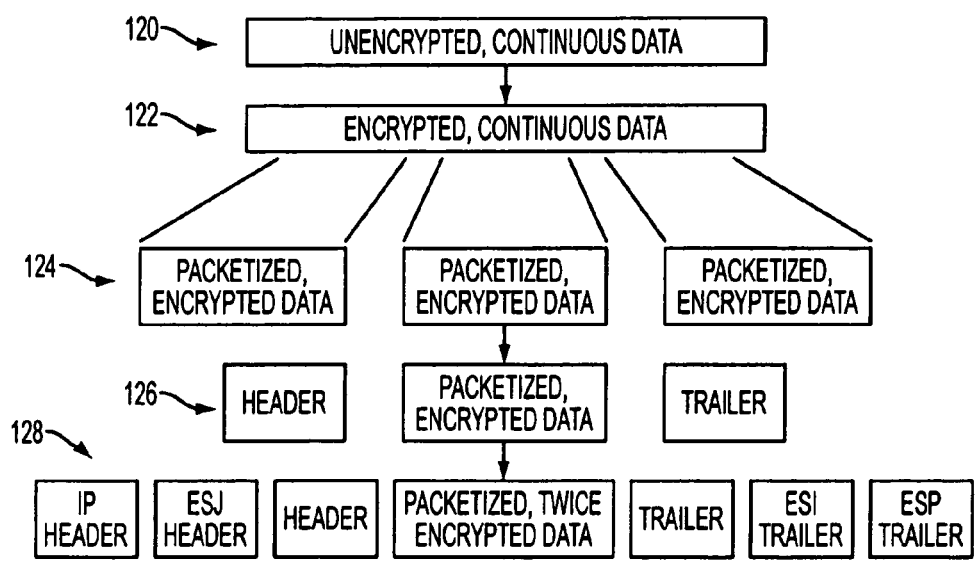
FIG. 7 is a block diagram of data as data is prepared for transmission over a packet switched network according to an embodiment of the present invention.

The nature of the data according to embodiments of the present invention as data is prepared for transmission over a packet switched network may be seen in FIG. 7. Unencrypted, continuous data 120 is encrypted a first time to become once encrypted, continuous data 122. After the first encryption, the once encrypted, continuous data is divided into portions, or is packetized, such that it becomes once encrypted, packetized data 124 suitable for transmission over a packet switching network. The packetized data may then be appended and prepended with a trailer and header 126, respectively, consistent with TCP/IP, such that it may be suitable for transmission over the Internet. The once encrypted, packetized data is then encrypted again such that it becomes twice encrypted, packetized data 128. The second encryption process may utilize IPSec protocols, which may prepend to each packet an IP header and, for example, an Encapsulated Secure Payload (ESP) header and append to each packet a standard ESP trailer as well as an ESP authentication trailer. The packetized, twice encrypted data may then be distributed over a packet switched network such as, for example, the Internet.

Figure 8:
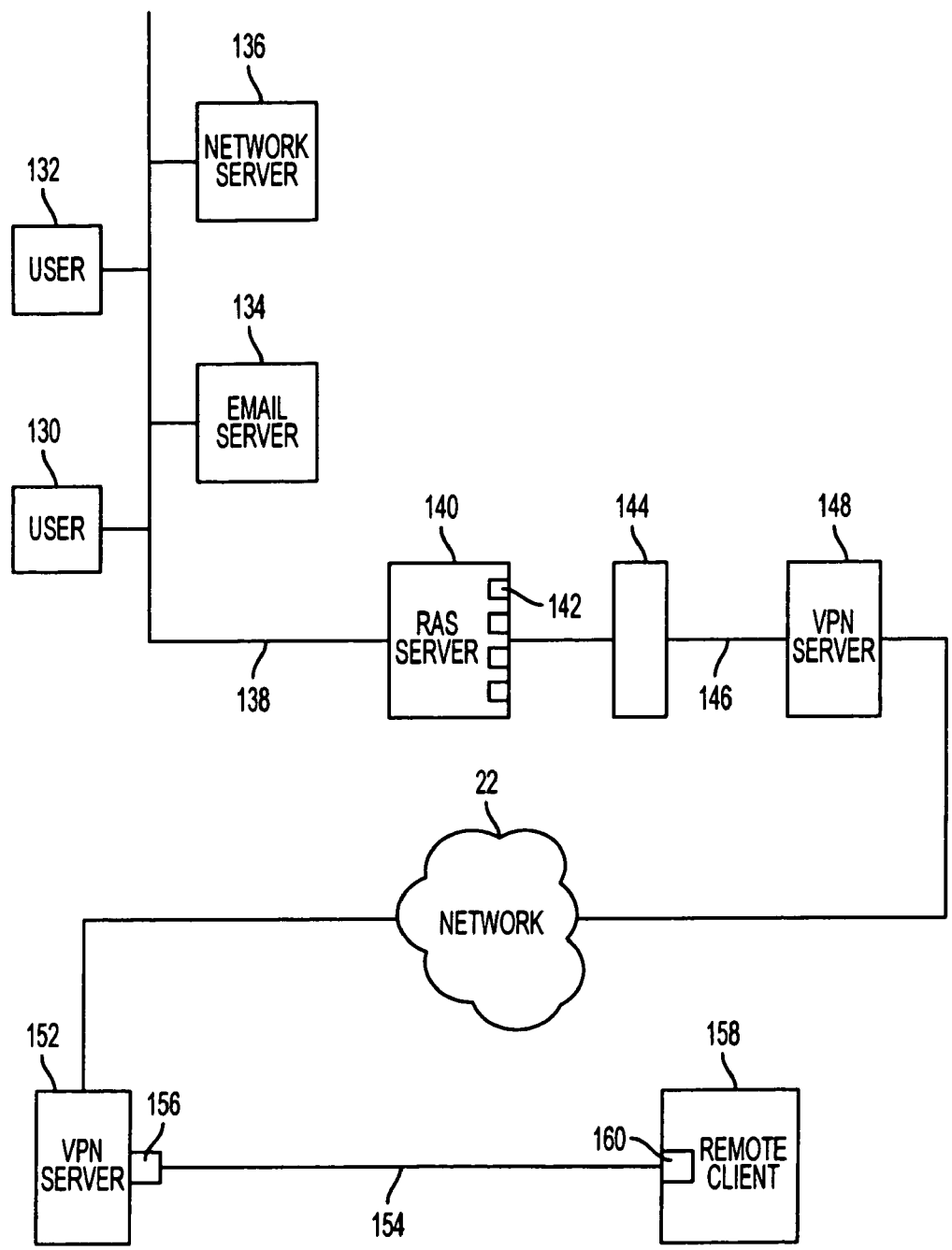
FIG. 8 is a block diagram of a system with multiple users and a remote access security according to an embodiment of the present invention.

A block diagram of a system according to an embodiment of the present invention implementing multiple users and a remote access server (RAS server) may be seen in FIG. 8. Any number of users 130, 132 as well as email servers 134, network servers 136 and the like may be connected to a LAN 138. The LAN 138 may also have a connection to a RAS server 140 to allow users at a remote location to interface with devices on the LAN 138. The RAS server 140 may contain any number of modems 142 or other devices allowing for a point-to-point or dedicated connection. The individual modems 142 in the RAS server 140 may be merged or concentrated into a modem concentrator 144. The modem concentrator 144 administrates the transmission of data from multiple modems. The modem concentrator 144 may interface to a dedicated communication link 146 such as, for example, PSTN lines, ISDN lines, DSL lines or T-1 lines.

The dedicated communication link may interface to a VPN server 148. The VPN server 148 may then wrap the data, i.e., packetize and IP encrypt the data, received from the RAS server 140 and transmit the data over a packet switched network 22 such as, for example, the Internet. The wrapped data may then be received from the packet switched network 22 by a second VPN server 152. The second VPN server 152 may then "unwrap" the data and transmit it via a dedicated line 154 using a modem 156 or other mechanism to a remote client 158.

The remote client 158 may be a portable computer or other portable computing device and may contain a modem 160 for receiving the unwrapped data from the second VPN server 152. The remote client 158 may then data link decrypt the data such that the data is then completely unencrypted and available for use. Alternatively, if there are several remote clients, the second VPN server 152 may transmit data to a second modem concentrator and then to individual modems in the remote client computers.

Figure 9:
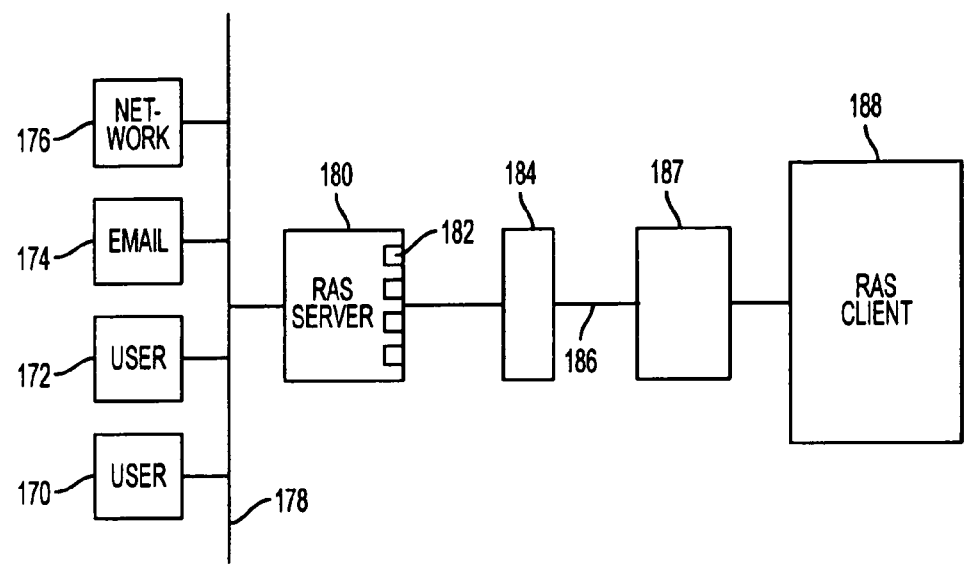
FIG. 9 is a block diagram of a system for securely transmitting data according to an embodiment of the present invention.

A block diagram according to another embodiment of the present invention is shown in FIG. 9. Any number of users 170, 172 as well as email servers 174, network servers 176 and the like may be connected to a LAN 178. The LAN 178 may also have a connection to RAS server 180 to allow a user or users at a remote location to interface with devices on the LAN 178. The RAS server 180 may contain any number of modems 182 or other devices allowing for a point-to-point or dedicated connection. The individual modems 182 in the RAS server 180 may be merged or concentrated into a modem concentrator 184. The modem concentrator 184 may interface to a dedicated communication link 186 such as, for example, PSTN lines, ISDN lines, DSL lines or T-1 lines. The dedicated communication link may interface to a server 187 which in turn interfaces to a RAS client 188. The RAS client 188 may be a laptop or other portable computing device.

Figure 10:
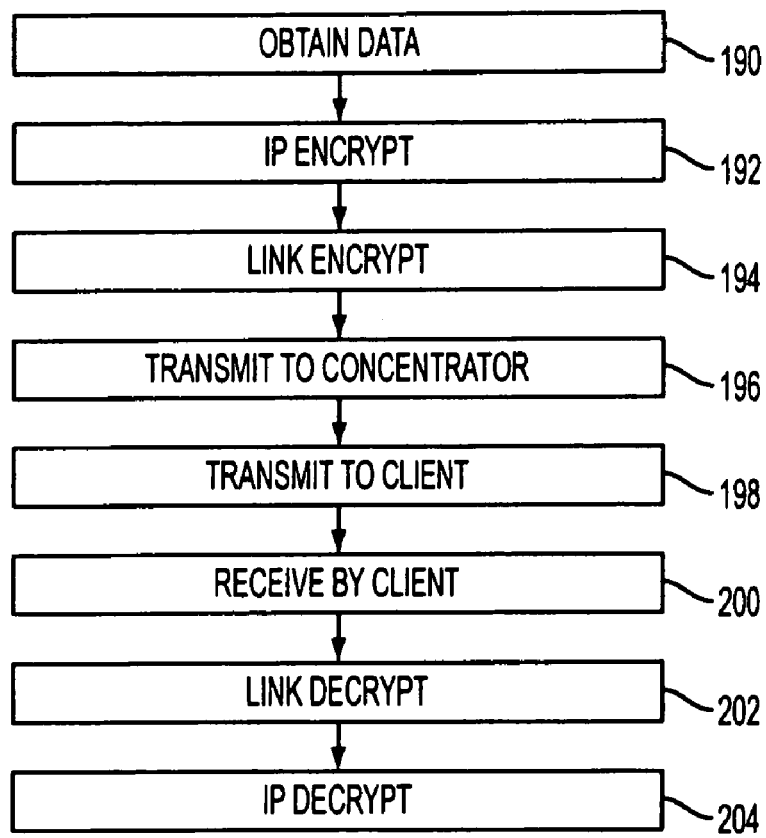
FIG. 10 is a flow chart of a method for securely transmitting data according to an embodiment of the present invention.

A flowchart detailing a method of operation for an embodiment of the present invention shown in FIG. 9 is shown in FIG. 10. Data for secure transmission is obtained at step 190. Such data may be generated by a user or may be the result of email server, network server or other operations within the LAN. The data is then encrypted at an IP layer by the RAS server at step 192 using any encryption algorithm suitable to a user, such as, for example, DES, TRIPLE DES, AES, SKIPJACK and BLOWFISH. Alternatively, the data may be encrypted at an IP layer by a network client or a VPN server. Subsequent to IP encryption, the data is then encrypted again at a data link layer by the RAS server at step 194, again using any encryption algorithm suitable to a user, which may be the same as or different than the algorithm used for encryption at the IP layer.

Once the data has been encrypted at the data link layer, the data may be transmitted from the RAS server via a modem or other transmission mechanism to a modem concentrator at step 196. The modem concentrator may then transmit the twice encrypted data over a dedicated communication link at step 198. The twice encrypted data may be received by a RAS client using a modem at step 200.

Once received by the RAS client, the data is first decrypted at the data link layer at step 202, then decrypted again at the IP layer at step 204. After decryption at the IP layer, the data is available for use by the remote user.

Embodiments of the present invention may also utilize tokens, keys, certificates or other authenticating mechanism to implement secure transmissions. For example, a user according to the embodiment of FIG. 9 may be required to enter an authenticating mechanism before being allowed access to the system. The authenticating mechanism may be used to verify that the user is the person that the user claims to be. Such authenticating mechanisms are used frequently in the art, especially in relation to the Internet. For example, a protocol known as Internet Security Association and Key Management Protocol/Oakley (ISAKMP/Oakley) allows a server to obtain a public key to authenticate a user using digital certificates.

Figure 11:
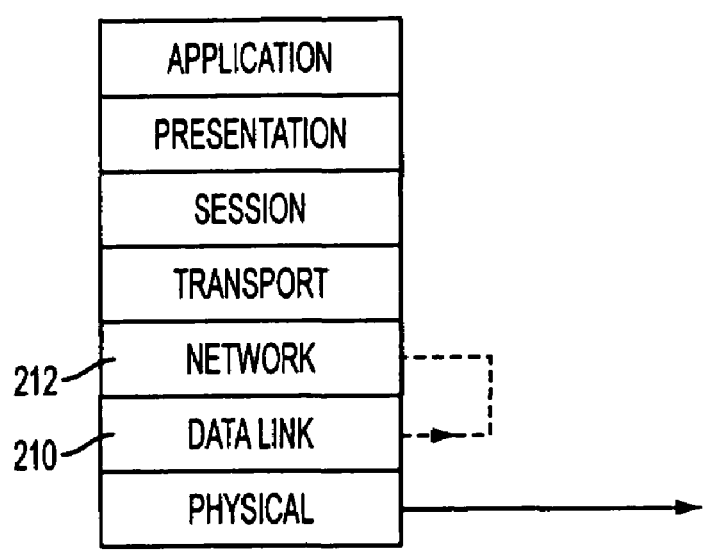
FIG. 11 is block diagram of a network model for securely transmitting data according to an embodiment of the present invention.

A block diagram according to an embodiment of the present invention using a network model may be seen in FIG. 11. In this embodiment, data may be first encrypted at a data link layer 210 in a system. Subsequently, the data link encrypted data may be routed back into the computer system where it may then be packetized and encrypted at the IP layer 212.

Subsequent to packetizing and IP encryption, the packetized, twice encrypted data may be transmitted over a packet switched network. Such data may be received by a user over the packet switched network and the foregoing process may be reversed such that the data is available for use.

While particular embodiments of the present invention have been shown and described, it will be obvious to those skilled in the art that the invention is not limited to the particular embodiments shown and described and that changes and modifications may be made without departing from the spirit and scope of the appended claims.

What is claimed is:

1. A method for securely transmitting data comprising:
    obtaining non-packetized data on a computer system for transmission;
    encrypting the data a first time such that the data is once encrypted;
    packetizing the once encrypted data;
    encrypting the packetized, once encrypted data a second time such that the data is twice encrypted; and
    transmitting the packetized, twice encrypted data.

2. The method according to claim 1, wherein encrypting the data a first time comprises encrypting the data at a data link layer.

3. The method according to claim 1, wherein encrypting the packetized, once encrypted data a second time comprises encrypting the data at an Internet Protocol layer.

4. The method according to claim 1, further comprising
    transmitting the once encrypted data from the computer system to an interface device; and
    receiving the once encrypted data at the interface device.

5. The method according to claim 4, wherein transmitting the once encrypted data comprises transmitting the once encrypted data using a modem.

6. The method according to claim 5, wherein the modem is an encrypting modem.

7. The method according to claim 4, wherein receiving the once encrypted data comprises receiving the once encrypted data using a modem.

8. The method according to claim 7, wherein the modem is an encrypting modem.

9. The method according to claim 1, wherein transmitting the packetized, twice encrypted data comprises transmitting the packetized, twice encrypted data using a network interface card.

10. The method according to claim 3, wherein the data encrypted at an Internet Protocol layer is encrypted using Internet Protocol Security protocols.

11. The method according to claim 4, wherein transmitting the packetized, twice encrypted data comprises transmitting the packetized, twice encrypted data from the interface device.

12. The method according to claim 1, wherein transmitting the packetized, twice encrypted data comprises transmitting the packetized, twice encrypted data over a network.

13. The method according to claim 12, wherein the network is the Internet.

14. A method for securely receiving data comprising:
    receiving packetized, twice encrypted data;
    decrypting the packetized, twice encrypted data a first time such that the packetized data is once decrypted;

reconstructing the non-packetized, once decrypted data; and decrypting the reconstructed, once decrypted data a second time.

15. The method according to claim 14, wherein receiving the packetized, twice encrypted data comprises receiving the packetized, twice encrypted data from a network.

16. The method according to claim 15, wherein the network is the Internet.

17. The method according to claim 14, wherein receiving packetized, twice encrypted data comprises receiving packetized, twice encrypted data at an interface device.

18. The method according to claim 14, wherein decrypting the packetized, twice encrypted data a first time comprises decrypting the packetized, twice encrypted at an Internet Protocol layer.

19. The method according to claim 17, further comprising:
transmitting the reconstructed, once decrypted data from the interface device; and
receiving the reconstructed, once decrypted data at a computer system.

20. The method according to claim 19, wherein transmitting the reconstructed, once decrypted data comprises transmitting the reconstructed, once decrypted data using a modem.

21. The method according to claim 20, wherein the modem is a decrypting modem.

22. The method according to claim 19, wherein receiving the reconstructed, once decrypted data comprises receiving the reconstructed, once decrypted data using a modem.

23. The method according to claim 22, wherein the modem is a decrypting modem.

24. The method according to claim 14, wherein decrypting the reconstructed, once decrypted data a second time comprises decrypting the reconstructed, once decrypted data at a data link layer.

25. The method according to claim 14, wherein receiving the packetized, twice encrypted data comprises receiving the packetized, twice encrypted data using a network interface card.

26. The method according to claim 18, wherein the data decrypted at an Internet Protocol layer is decrypted using Internet Protocol Security protocols.

27. A method for securely transmitting and receiving data comprising:
obtaining non-packetized data on a first computer system for transmission;
encrypting the data a first time such that the data is once encrypted;
transmitting the once encrypted data from the first computer system to a first interface device;
receiving the once encrypted data at the first interface device;
packetizing the once encrypted data;
encrypting the packetized, once encrypted data a second time such that the data is twice encrypted; and
transmitting the packetized, twice encrypted data from the first interface device to a second interface device;
receiving packetized, twice encrypted data at the second interface device;
decrypting the packetized, twice encrypted data a first time such that the packetized data is once decrypted;
reconstructing the packetized, once decrypted data;
transmitting the reconstructed, once decrypted data from the second interface device to a second computer system;
receiving the reconstructed, once decrypted data at the second computer system; and
decrypting the reconstructed, once decrypted data a second time.

28. The method according to claim 27, wherein encrypting the data a first time comprises encrypting the data at a data link layer.

29. The method according to claim 27, wherein, encrypting the packetized, once encrypted data a second time comprises encrypting the packetized, once encrypted data at an Internet Protocol layer.

30. The method according to claim 27, wherein transmitting the packetized, twice encrypted data comprises transmitting the packetized, twice encrypted data over a network.

31. The method according to claim 30, wherein the network is the Internet.

32. The method according to claim 27, wherein receiving the packetized, twice encrypted data comprises receiving the packetized, twice encrypted data from a network.

33. The method according to claim 32, wherein the network is the Internet.

34. The method according to claim 27, wherein decrypting the packetized, twice encrypted data a first time comprises decrypting the packetized, twice encrypted data at an Internet Protocol layer.

35. The method according to claim 27, wherein decrypting the reconstructed, once decrypted data a second time comprises decrypting the reconstructed, once decrypted data at a data link layer.

36. A system for securely transmitting and receiving data comprising:
a first computer system for encrypting and transmitting non-packetized data, the first computer system having a transmission mechanism;
a first interface device for receiving once encrypted data from the first computer system, and for packetizing, encrypting and transmitting data, the first interface device having a receiving mechanism and a network connection;
a second interface device for receiving twice encrypted data from the first interface device, and for decrypting, reconstructing and transmitting data, the second interface device having a network connection and a transmission mechanism; and
a second computer system for receiving once decrypted data from the second interface device and for decrypting data, the second computer system having a receiving mechanism,
wherein the first computer system once encrypts data and transmits the once encrypted data to the first interface device via the transmission mechanism of the first computer system, and
wherein the first interface device receives the once encrypted data via the receiving mechanism of the first interface device, packetizes the once encrypted data, encrypts the once encrypted data and transmits twice encrypted data to the second interface device via a network, and
wherein the second interface device receives the twice encrypted data from the first interface device via the network, once decrypts the twice encrypted data, reconstructs the packetized data and transmits reconstructed, once decrypted data to the second computer system via the transmission mechanism of the second interface device, and
wherein the second computer system receives once decrypted data from the second interface device via the receiving mechanism of the second computer system and decrypts again the once decrypted data.

37. The system according to claim 36, wherein the data once encrypted by the first computer is encrypted at a data link layer.

38. The system according to claim 36, wherein the data encrypted a second time by the first interface device is encrypted at an Internet Protocol layer.

39. The system according to claim 36, wherein the data once decrypted by the second interface device is decrypted at an Internet Protocol layer.

40. The system according to claim 36, wherein the data twice decrypted by the second computer is decrypted at a data link layer.

41. The system according to claim 36, wherein the network is the Internet.

42. A method for transmitting secure data comprising:

encrypting non-packetized data at a data link layer;

packetizing the data;

encrypting the packetized data at an Internet Protocol layer; and transmitting the packetized, encrypted data over a network.

43. The method according to claim 42, wherein the network is the Internet.

* * * * *